United States Patent [19]
Li

[11] Patent Number: 6,098,431
[45] Date of Patent: Aug. 8, 2000

[54] LOCKING STRUCTURE FOR MANUAL SHIFT LEVERS

[76] Inventor: Chi-yuan Li, No. 747-7, Chung-cheng Rd., Hsin-Chuang City, Taipei, Taiwan

[21] Appl. No.: 09/368,519

[22] Filed: Aug. 5, 1999

[51] Int. Cl.⁷ .................................................... B60R 25/06
[52] U.S. Cl. ................................ 70/195; 70/197; 70/201; 70/247
[58] Field of Search ............................. 70/195, 197, 201, 70/247

[56] References Cited

U.S. PATENT DOCUMENTS

| | | | |
|---|---|---|---|
| 999,462 | 8/1911 | Miller | 70/195 |
| 1,323,447 | 12/1919 | Brown | 70/201 |
| 1,673,908 | 6/1928 | George | 70/247 |
| 1,791,807 | 2/1931 | Doane | 70/247 |
| 5,134,764 | 8/1992 | Taylor | 70/201 X |
| 5,473,918 | 12/1995 | Hixon | 70/247 X |
| 5,490,403 | 2/1996 | Bianco, Sr. | 70/247 X |
| 5,596,894 | 1/1997 | Lee | 70/201 |
| 5,775,141 | 7/1998 | Li | 70/247 X |

FOREIGN PATENT DOCUMENTS

| | | | |
|---|---|---|---|
| 2590857 | 6/1987 | France | 70/247 |
| 416526 | 11/1946 | Italy | 70/195 |
| 173157 | 12/1921 | United Kingdom | 70/195 |

*Primary Examiner*—Lloyd A. Gall
*Attorney, Agent, or Firm*—Bacon & Thomas, PLLC

[57] ABSTRACT

A manual shift lever locking structure including a knob moveable up and down relative to an axle of the shift lever; a lock in the knob for locking and fixing the knob and the axle of the shift lever relative to each other; and a restraining element provided under the knob for restraining the lower end of the knob wherein the axle of the shift lever are restrained from movement.

6 Claims, 6 Drawing Sheets

LOCKING STRUCTURE FOR MANUAL SHIFT LEVERS

BACKGROUND OF THE INVENTION

1. Field of the Invention

The present invention is related to a manual shift lever locking structure, and especially to a locking structure used on a manual shift lever. Wherein, a knob on the shift lever can move up and down relative to the axle of the latter, then the lock in the knob can be locked and can fix the knob and the axle of the shift lever in a relative position to each other. Thereafter, a restraining element provided under the knob is used to restrain the knob and the axle of the shift lever from movement, and an effect of theft proofing is attained.

2. Description of the Prior Art

Conventional theft-proof devices used presently are divided mainly into the electronic type and the mechanical type. In activating of an electronic type device, the storage batteries for it are always turned on, thereby consumption of electric energy is astonishingly large. It is often that the energy of the storage batteries for such a device is exhausted to induce the result of inability of activating a car. Hence the effect of theft proofing is doubtful. Therefore, most owners of cars prefer the mechanical type theft-proof devices. Wherein, locks are arranged to fit the appropriate structures of shift levers to give effects of theft proofing. By the problem of heaviness as well as inconvenience of locking and unlocking of large theft-proof devices existing, most car owners use the smaller theft-proof devices added in shift levers which are more convenient for use.

Theft-proof devices for shift levers are provided mainly for the purpose of fixing a shift lever and preventing thieves from moving the shift levers. In such a conventional theft-proof device, a base is required to weld to the body of a car for mounting a lock. Then a U shaped rod loops the shift lever and is secured on the lock to lock the shift lever.

Such a theft-proof device for a shift lever is supposed to cooperate with a U shaped rod. The weight of the U shaped rod (shall be made of steel with high strength) and the lock head (being of the same material as that of the U shaped rod) is so large that a user will feel very heavy in operation.

The lightest shift lever locks used on cars presently are those locks provided directly in the heads of shift levers. There are various locks provided in the heads of shift levers in the markets, they get the object of theft-proofing taking advantage of the fact that the shifting push-button on a shift lever head can not be down pressed for shifting when a lock is locked. However, such locks provided in the heads of shift levers can only be used for automatic gear shifting although they are convenient in operation. They are not suitable for various manual shift levers in the markets. Thereby, car owners still can get the object of theft proofing only depending on the heavy and inconvenient stick-like locks.

SUMMARY OF THE INVENTION

Therefore, the primary object of the present invention is to provide a locking structure for manual shift levers, and especially to a locking structure used on a manual shift lever. Wherein, a knob on the shift lever can move up and down relative to the axle of the latter, then the lock in the knob can be locked and can fix the knob and the axle of the shift lever in a relative position to each other. Thereafter, a restraining element provided under the knob is used to restrain the knob and the axle of the shift lever from movement. Hence an effect of theft proofing can be attained.

The present invention will be apparent in its objects and detailed structure after reading the detailed description of the preferred embodiment thereof in reference to the accompanying drawings.

DETAILED DESCRIPTION OF THE PREFERRED EMBODIMENT

Figure 1:
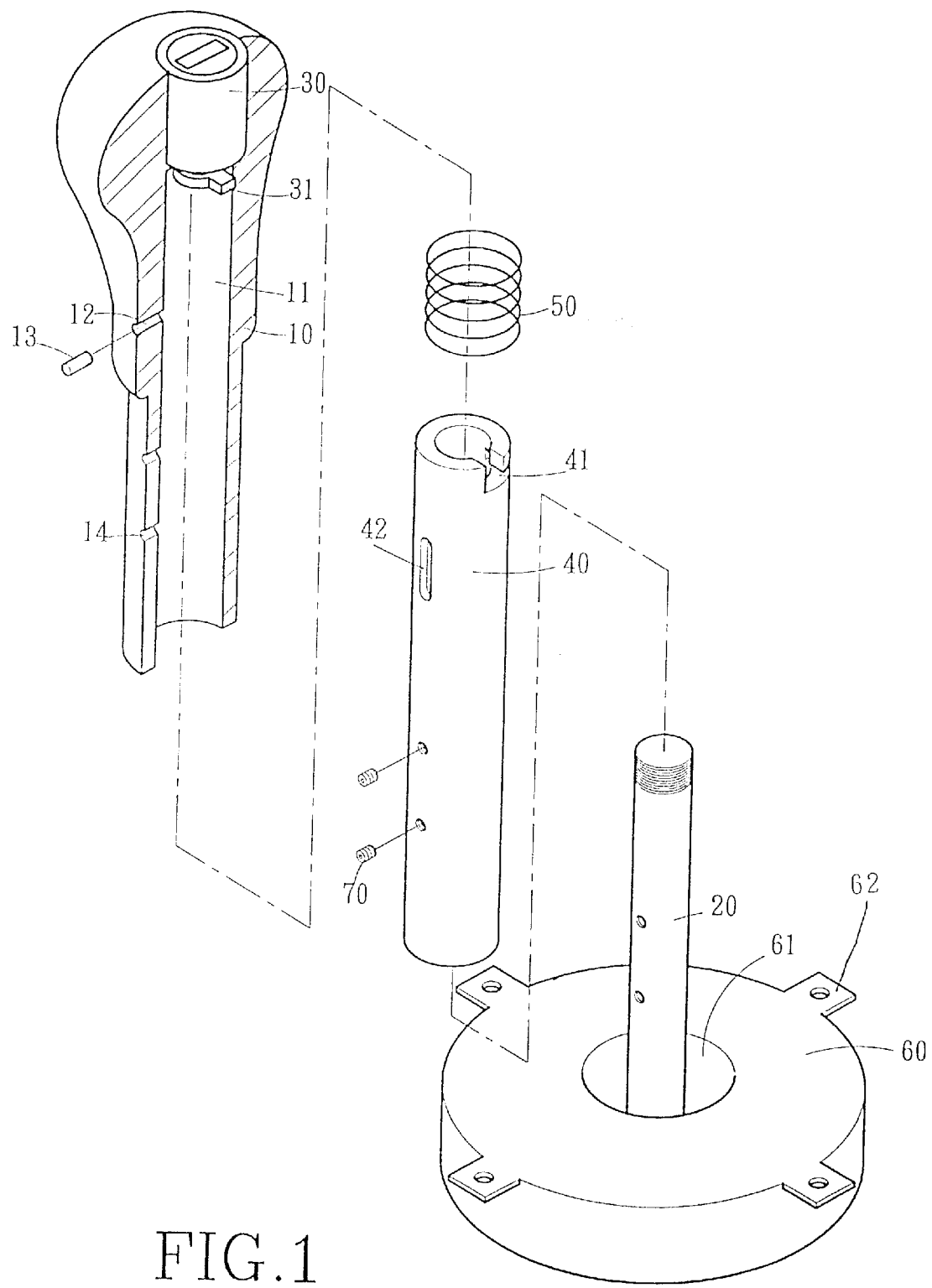
FIG. 1 is an analytic perspective view of the present invention.

Referring to the drawings, in the manual shift lever locking structure or the locking structure used on a manual shift lever of the present invention, a knob 10 on the shift lever can move up and down relative to the axle 20 of the latter, then the lock 30 in the knob 10 can be locked and can fix the knob and the axle of the shift lever in a relative position to each other. Thereafter, a restraining element 60 provided under the knob 10 is used to restrain the knob 10 and the axle 20 of the shift lever from movement. Hence an effect of theft proofing can be attained.

As shown in FIG. 1, the present invention is comprised of the knob 10, a lock 30, a sleeve 40, a spring 50 and the restraining element 60 provided under the knob 10.

Wherein, the knob 10 is provided centrally with a bore 11 which has on its wall a pinhole 12 for insertion of a pin 13. A plurality of through holes 14 are provided on the lower portion of the knob 10.

The lock 30 is provided on the top of the bore 11, and on the bottom of the lock core of the lock 30 there is provided an engaging member 31.

The inside diameter of the sleeve 40 is equal to the outside diameter of the axle 20. The sleeve 40 is locked securely together with the axle 20 of the shift lever by means of screws 70. The outside diameter of the sleeve 40 is further equal to the diameter of the bore 11 and can thus be connected with the knob 10 to allow the knob 10 on the shift lever to move up and down relative to the axle 20. The sleeve 40 is provided on the top thereof with an engaging notch 41 to receive and engage with the above mentioned engaging member 31 during locking. The sleeve 40 is further provided on the outside wall thereof with a limiting slot 42 to limit the position of the knob 10 relative to the sleeve 40 when the pin 13 is inserted.

The spring 50 is allocated between the knob 10 and the sleeve 40 and is used to move the knob 10 upwardly.

The restraining element 60 is provided with a fixing hole 61 for insertion of the lower portion of the knob 10 and a plurality of peripheral fixing members 62 to mount the restraining element 60 at the bottom of the shift lever by slipping the fixing hole 61 over the axle 20. The diameter of the fixing hole 61 shall be equal to or slightly larger than that of the lower portion of the knob 10, and is large enough to allow displacement of the axle 20 during shifting.

Figure 2:
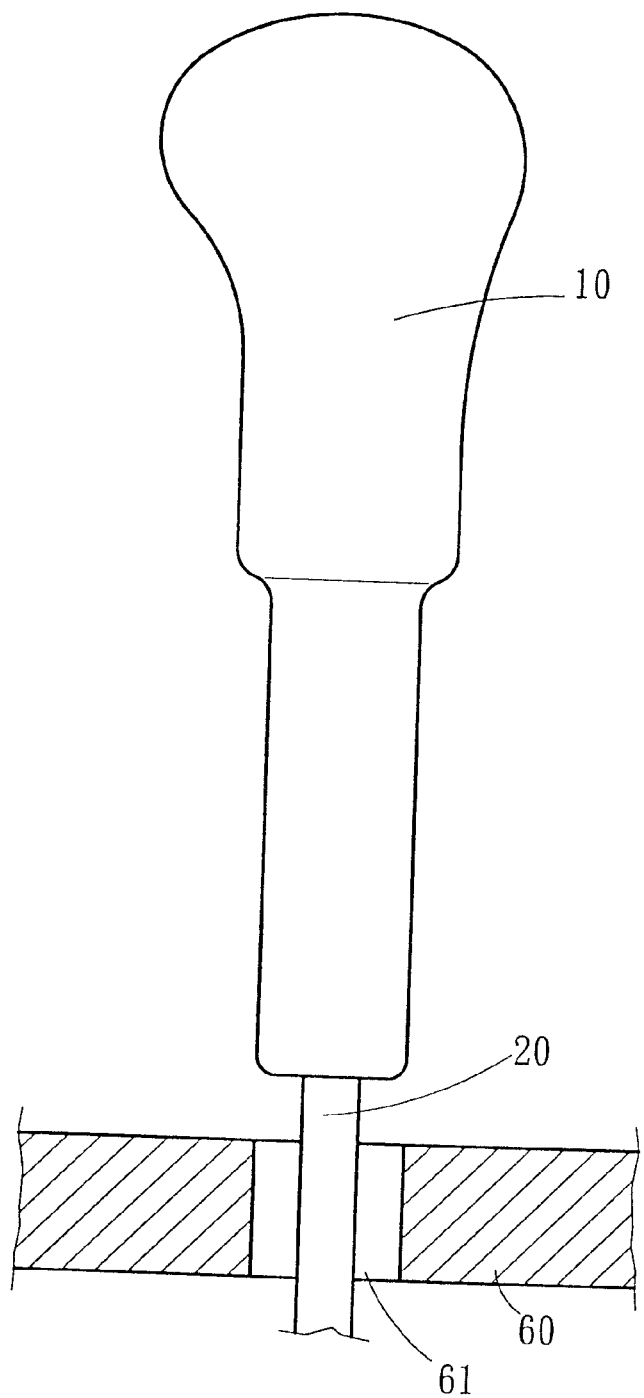
FIGS. 2 and 3 are schematic views showing operation of the present invention when it is unlocked.
Figure 3:
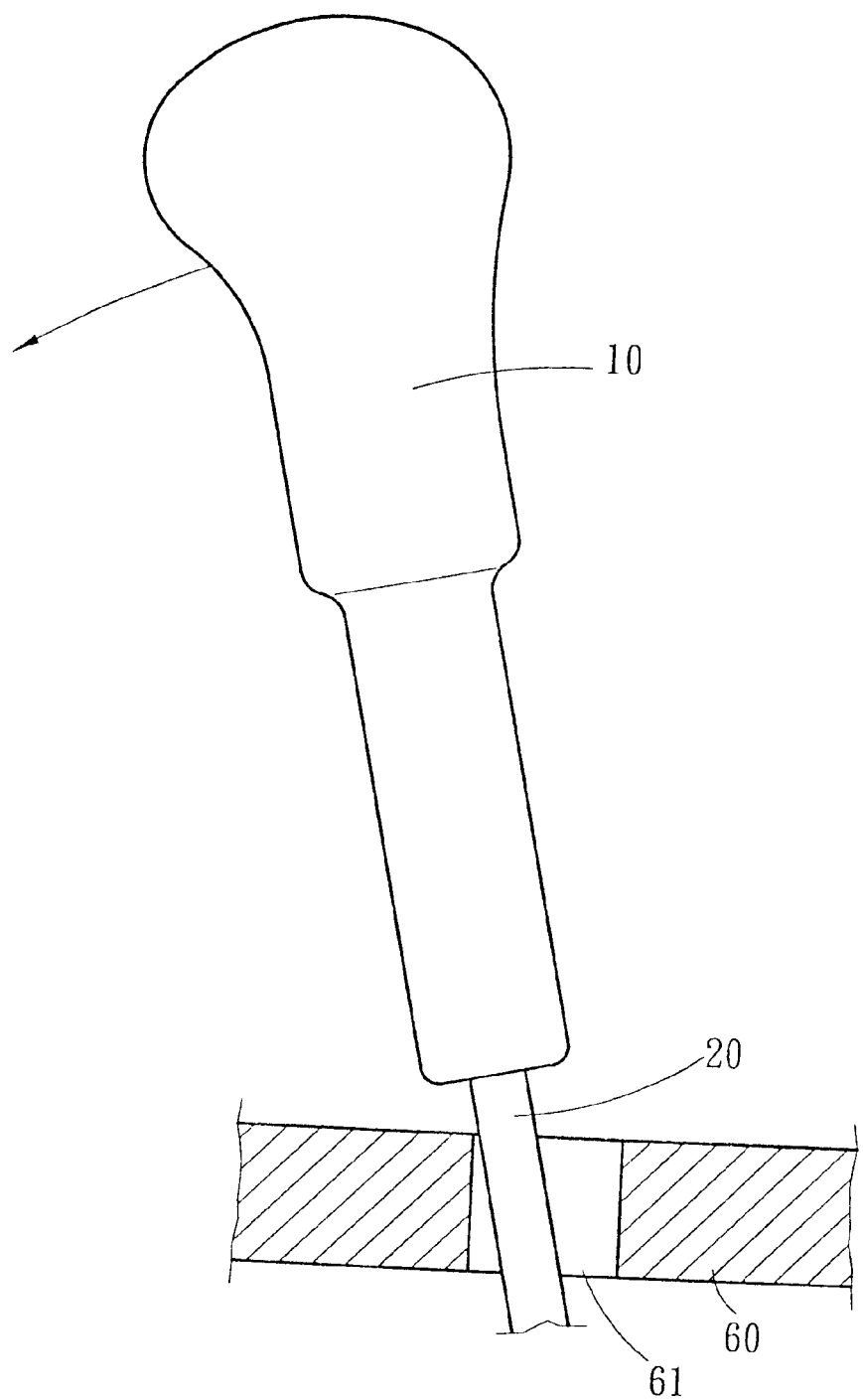

When the above stated structure has been assembled, the screws 70 can be extended through the through holes 14 of the knob 10 to lock the sleeve 40 on the axle 20. Now the present invention is locked and integrally connected with the axle 20 of the shift lever. Under the normal condition, the knob 10 is subjected to the force of the spring 50, and thereby is located at the uppermost unlocking position. At this moment, the knob 10 can be easily moved together with the axle 20 of the shift lever for normal shifting (as shown in FIGS. 2 and 3).

Figure 4:
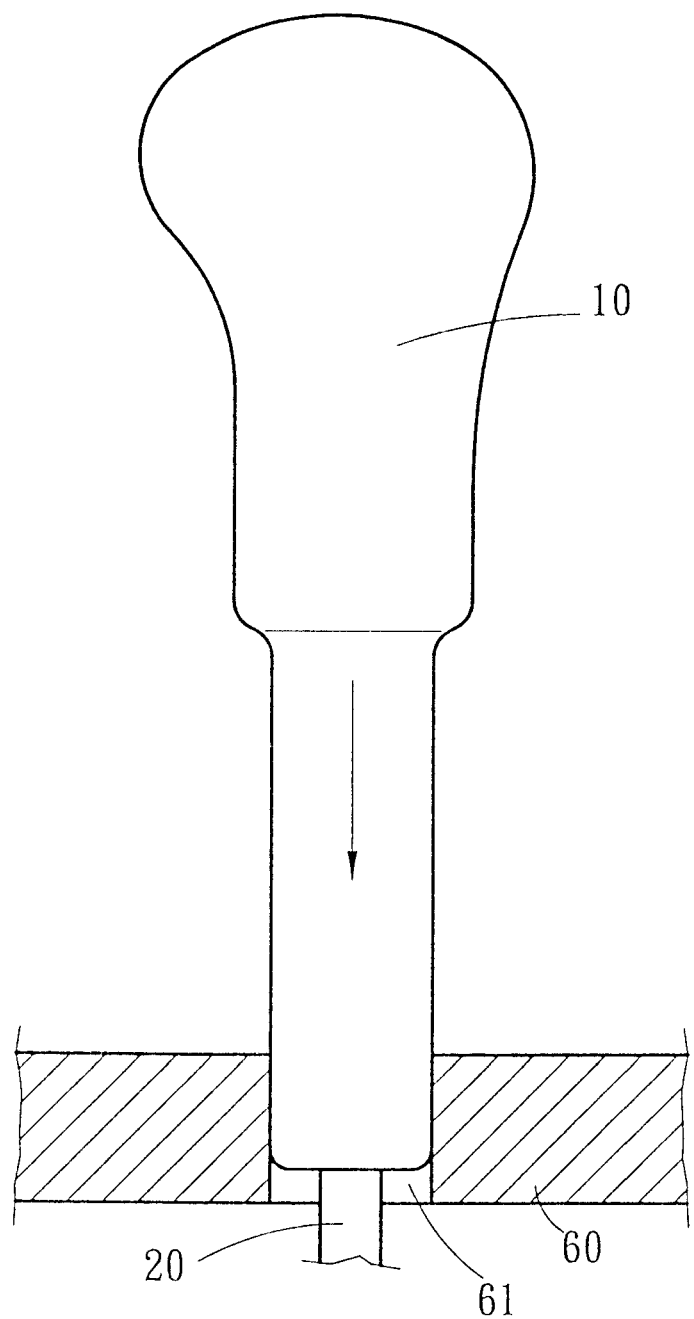
FIG. 4 is a schematic view showing operation of the present invention when it is locked.

Slide the knob 10 downwardly relative to the sleeve 40 and the axle 20, and use the lock 30 to lock the knob 10 in a relative position to the sleeve 40 and the axle 20. The lower portion of the knob 10 now is engaged in the fixing hole 61 of the restraining element 60 at the bottom of the axle 20 of the shift lever. In this way, the knob 10 can not be moved together with the axle 20 of the shift lever for shifting (as shown in FIG. 4). Hence an effect of theft proofing can be attained.

Figure 5:
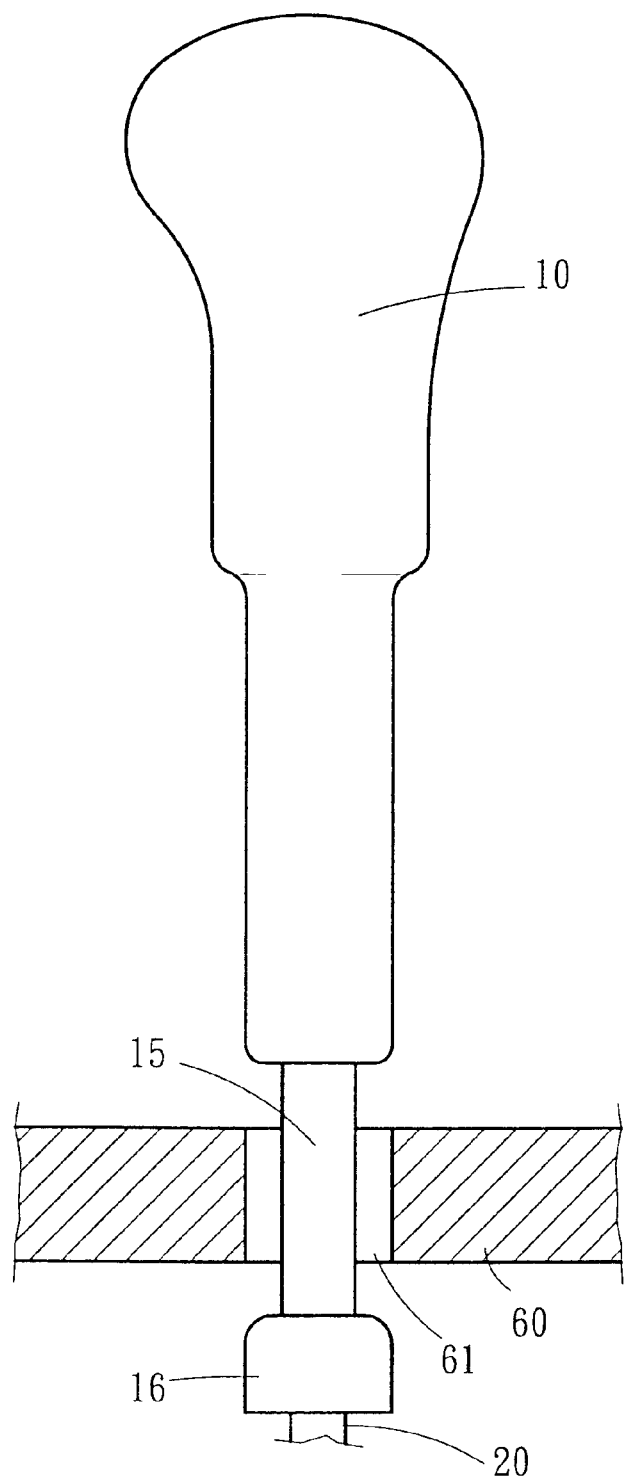
FIGS. 5 and 6 show another embodiment of the present invention.
Figure 6:
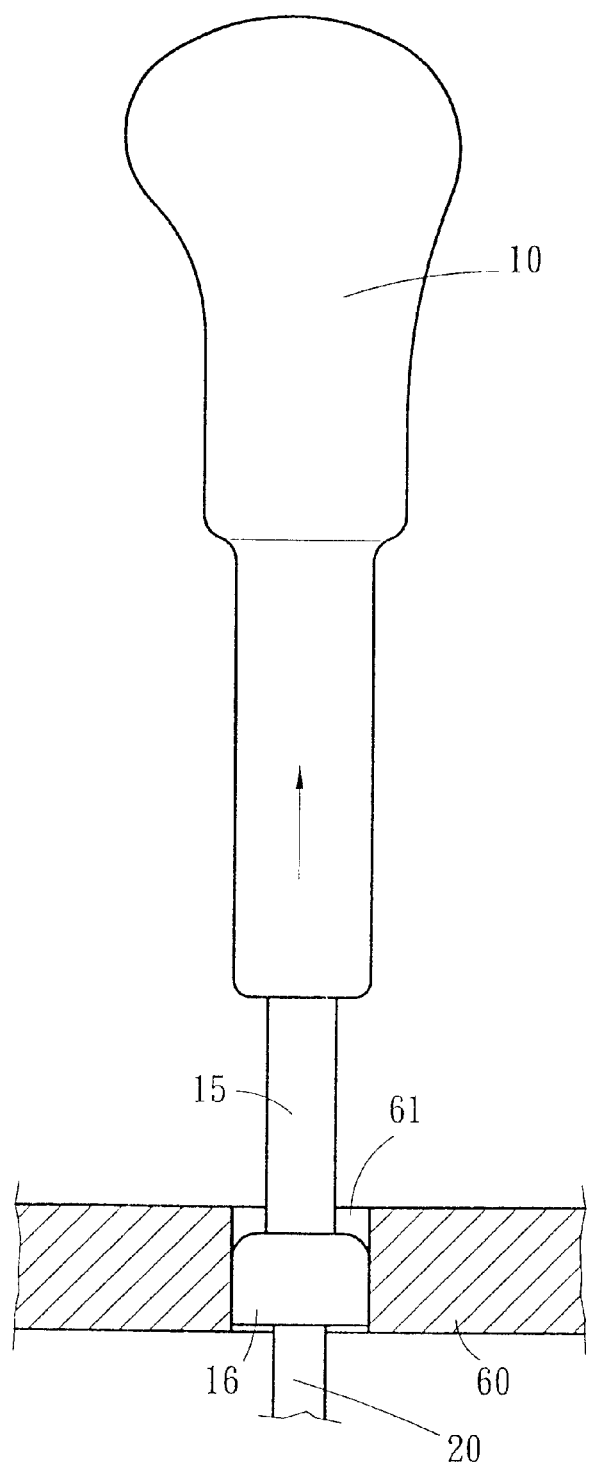

And as shown in FIGS. 5 and 6 depicting another embodiment of the present invention, a neck portion 15 is provided on the lower portion of the knob 10 and extends through the fixing hole 61 of the restraining element 60. A gap of adequate size shall be provided between the neck portion 15 and the fixing hole 61 for gear shifting. The neck portion 15 is provided on the lower portion thereof with a protruding block 16 coincident by size with the fixing hole 61. When the knob 10 is pulled upwardly and is locked with the lock 30, the protruding block 16 will be engaged in the fixing hole 61, so that the knob 10 together with the axle 20 of the shift lever can not be moved for shifting. This too can attain an effect of theft proofing.

In the procedure of operation of the present invention, by cooperation of the pin 13 and the limiting slot 42, the relative distance of displacement and relative angle of the knob 10 to the axle 20 are limited. Such a design allows operation of a user to be more propitious.

Again from FIG. 1, the through holes 14 making the sleeve 40 and the axle 20 of the shift lever locked securely by means of screws 70 are exposed when in an unlocking state. Hence it is ready for detachment, maintenance or changing. While if the lock 30 of the present invention is in a locking state, the knob 10 is pressed down and the through holes 14 are not aligned with the screws 70, the wall of the knob 10 hides and protects the screws 70 to prevent illegal detachment. Such a feature not only benefits to assembling and detachment of the present invention with and from the axle 20 of the shift lever, but also effectively prevents illegal detachment. Thus the present invention is inventive.

Besides, in order to meet various specifications of shift levers, specifications of the knob 10 of the present invention can be unified. In this way, the sleeve 40 can be made to belong to the specification with its outside diameter adapted to slipping in the knob 10 and with its inside diameter adapted to slipping over the axle 20. Thereby, the knob 10 of the same specification can suit various specifications of shift lever mechanisms. And therefore, cost of production can be lowered and convenience of management of material can be increased.

The manual shift lever locking structure of the present invention has a theft-proof lock embedded in a manual shift lever mechanism. Thereby, when a car owner wants to lock the shift lever, it needs only to press down the knob of the shift lever, the shift lever will be unable to be moved. Then a theft-proof effect is effected. Not only the defect of inconvenience resided in a conventional manual shift lever lock is removed, but also the theft-proof effect is maintained even when a thief saws the shift lever axle or strikes it with heavy force to destroy it. Therefore, the practical function of the lock can be enhanced.

The present invention has been described with the above stated embodiments of the structure. When the knob is pressed down and member 31 rotated, locking function is effected with the lock. It is outstanding only in variation of the locking structure which makes a different way of operation.

In conclusion, the manual shift lever locking structure of the present invention is novel, it makes convenience in operation of the lock, and thereby is improved.

Having thus described my invention, what I claim as new and desire to be secured by Letters Patent of the United States are:

1. A manual shift lever locking structure, comprising:
    a knob moveable up and down relative to an axle of said shift lever;
    a lock in said knob for locking and fixing said knob and said axle of said shift lever relative to each other; and
    a restraining element provided under said knob and engageable with said knob for restraining the lower end of said knob wherein said knob and said axle of said shift lever are restrained from movement, and an effect of theft proofing is attained.

2. A manual shift lever locking structure as claimed in claim 1, wherein,
    said knob is provided with a central bore for mounting of said lock which is provided with an engaging member;
    a sleeve is provided in said bore, said knob is slidable relative to said sleeve, said sleeve is locked securely together with said axle of said shift lever by means of screws, and said sleeve is provided on the top thereof with an engaging notch to engage with said engaging member;
    a spring is arranged between said knob and said sleeve to move said knob upwardly; and
    a relative position of said knob and said axle of said shift lever is fixed by said lock when said knob is pressed down.

3. A manual shift lever locking structure as claimed in claim 2, wherein,
    said bore has on its wall a pin hole for insertion of a pin; and
    said sleeve is provided on the outside wall thereof with a limiting slot to limit the relative distance of displacement and relative angle of displacement of said knob with respect to said sleeve when said pin is inserted.

4. A manual shift lever locking structure as claimed in claim 2, wherein,
    a plurality of through holes are provided on the lower portion of said knob and extending therethrough for receiving said screws to lock said sleeve on said axle of said shift lever, said through holes exposing said screws when in an unlocking state, and said through holes not being aligned with said screws when in a locking state so that the wall of said knob hides and protects said screws.

5. A manual shift lever locking structure as claimed in claim 2, wherein,
    said sleeve has an outside diameter adapted to slipping in said knob and an inside diameter adapted to slipping over said axle so that a single knob design can be used with various shift lever mechanisms.

6. A manual shift lever locking structure as claimed in claim 1 wherein said knob is provided with a central bore for receiving said axle of said shift lever, said bore forming an open end of said knob for locking against said restraining element.

* * * * *